United States Patent

Wang

Patent Number: 6,069,205
Date of Patent: May 30, 2000

[54] BLOCK COPOLYMERS

[75] Inventor: Jin-Shan Wang, Rochester, N.Y.

[73] Assignee: Eastman Kodak Company, Rochester, N.Y.

[21] Appl. No.: 08/943,925

[22] Filed: Oct. 3, 1997

[51] Int. Cl.$^7$ .......... C08F 293/00; C08F 297/00
[52] U.S. Cl. .......... 525/242; 525/280; 525/293; 525/296; 525/307; 525/308
[58] Field of Search .......... 525/242, 244, 525/280, 293, 296, 302, 307, 308

[56] References Cited

U.S. PATENT DOCUMENTS

| | | | |
|---|---|---|---|
| 4,847,326 | 7/1989 | Vitkuske et al. | 525/89 |
| 5,763,548 | 6/1998 | Matyjaszewski et al. | 526/135 |
| 5,807,937 | 9/1998 | Matyjaszewski et al. | 526/135 |
| 5,863,978 | 1/1999 | Vosters | 524/505 |

OTHER PUBLICATIONS

"Block Copolymers by Transformation of "Living" Carbocationic into "living" Radical Polymerization", Coca et al, Polymer Preprints, 38(1), pp.693–694, 1997.
Polystyreme–b–Polyisoprene–b–Polystyrene Block Copolymers by Combining Living Cationic and Living Free Radical Polymerization. Chen et al, Polymer Preprints, 38(1), pp. 715–716, 1997.
Wang. J. Am. Chem. Soc., 117, 5614 (1995).
Wang, Polymeric Material Science and Engineering (ACS, Polymer Mateirals Div.), 73, 416 (1995).
Coca, Polymer Preprint (ACS, Polymer Chemistry Div.), 38(1), 693 (1997).
Chen, Polymer Preprint (ACS, Polymer Chemistry Div.), 38(1), 715 (1997).
Paul C. Hiemenz, "Polymer Chemistry the Basic Concepts, The Chains and Averages of Polymers", 1984, Marcel Dekker, Inc., p. 12.

Primary Examiner—Jeffrey C. Mullis
Attorney, Agent, or Firm—Carl F. Ruoff

[57] ABSTRACT

The present invention is block copolymer of the formulas I and II $$(PA)_x(PB)_yX \qquad (I)$$

$$X(PB)_y(PA)_x(PB)_yX \qquad (II)$$

wherein PA is an ethylenically unsaturated monomer, and PB is a cationically polymerizable monomer that can be initiated with an alkyl halide or without catalysts, x is 4 to 500,000 and y is from 2 to 500,000 and X is a halogen atom. The present invention also provides a method for making a block copolymer of the formulas I and II $$(PA)_x(PB)_yX \qquad (I)$$

$$X(PB)_y(PA)_x(PB)_yX \qquad (II)$$

wherein PA is an ethylenically unsaturated monomer, and PB is a cationically polymerizable monomer that can be initiated with an alkyl halide, x is 4 to 500,000 and y is from 2 to 500,000 and X is a halogen atom. The reaction is initiated by an atom transfer radical polymerization of the PA monomer with an initiator to produce a polymer of the formulas (III) or (IV)

$$(PA)_xX \qquad (III)$$

$$X(PA)_xX \qquad (IV)$$

wherein X is a halogen atom. The reaction proceeds by adding the polymer of the formulas (II) or (IV) to monomer (PB) to initiate a cationic polymerization reaction to produce a polymer shown in formulas (I) and (II) above.

5 Claims, No Drawings

BLOCK COPOLYMERS

FIELD OF THE INVENTION

The invention pertains to novel block copolymers obtained from a combination process of atom transfer radical polymerization and living cationic polymerization.

BACKGROUND OF INVENTION

Block copolymer represents a very important class of polymeric materials which have been widely used as dispersants, compatibilizers, thermoplastic elastomers, adhesives, rheology modifiers, etc. Living polymerization paves the best way to prepare the block copolymers. However, since monomers usually have very strong chemoselectivity towards active centers, the block copolymerization across different mechanisms has been always difficult.

Moreover, contrary to living ionic polymerization, radical polymerization was not a well-controlled process until 1993. Therefore, synthesis of block copolymer through transformation from living ionic polymerization to living radical polymerization has not been well explored. In 1995, a living radical polymerization process named atom transfer radical polymerization (ATRP) was discovered (Wang, J. Am. Chem. Soc. 117, 5614 (995)). The most important feature of ATRP is that one may synthesize various well-defined polymers under radical polymerization conditions (Wang, Polymeric Material Science and Engineering (ACS, Polymer Materials Div.), 73, 416(1995)). Given the fact that an alkyl halide is used to initiate the ATRP, several papers reported synthesizing the block copolymers by transformation from a polymeric halide obtained from living cationic polymerization to ATRP. Coca et al first synthesized chlorine-ended styrene (PSt-Cl) or α, W-dichlorine poly-isobutene end-capped with a few units of styrene (Cl-St-PIB-StCl) by living cationic polymerization and followed with ATRP of methyl acrylate (MA) or isobornyl acrylate (IBA) with the formation of polystyrene-b-poly methyl acrylate (PSt-b-PMB) and PMA(IBA)-b-St-PIB-St-PMA (IBA), respectively (Coca, Polymer Preprint (ACS, Polymer Chemistry Div.), 38(1), 693(1997)). A similar approach was demonstrated by Chen et al in preparing PSt-b-PIB-b-PSt block copolymers (Chen, Polymer Preprint (ACS, Polymer Chemistry Div.), 38(1), 715(1997)).

SUMMARY OF THE INVENTION

The present invention is block copolymer of the formulas I and II $$(PA)_x(PB)_yX \quad (I)$$

$$X(PB)_y(PA)_x(PB)_yX \quad (II)$$

wherein PA is an ethylenically unsaturated monomer, and PB is a cationically polymerizable monomer that can be initiated with an alkyl halide or without catalysts, x is 4 to 500,000 and y is from 2 to 500,000 and X is a halogen atom.

The present invention also provides a method for making a block copolymer of the formulas I and II $$(PA)_x(PB)_yX \quad (I)$$

$$X(PB)_y(PA)_x(PB)_yX \quad (II)$$

wherein PA is an ethylenically unsaturated monomer, and PB is a cationically polymerizable monomer that can be initiated with an alkyl halide, x is 4 to 500,000 and y is from 2 to 500,000 and X is a halogen atom. The reaction is initiated by an atom transfer radical polymerization of the PA monomer with an initiator to produce a polymer of the formulas (II) or (IV)

$$(PA)_xX \quad (III)$$

$$X(PA)_xX \quad (IV)$$

wherein X is a halogen atom. The reaction proceeds by adding the polymer of the formulas (II) or (IV) to monomer (PB) to initiate a cationic polymerization reaction to produce a polymer shown in formulas (I) and (II) above.

DETAILED DESCRIPTION OF THE INVENTION

Some cationic polymerization of monomers such as vinyl ethers, styrenes, and cyclic imino ethers, can be performed using alkyl halide as an initiator in a living fashion. ATRP may give rise to a polymer containing terminal active halide atom(s). The present invention is a exploits a process using ATRP and living cationic polymerization to prepare block copolymers by combining these two polymerization processes. The ATRP reaction is carried out at a temperature of from 0° C. to 200° C.

As noted above, the instant products are prepared by reacting a polymeric halide, which is obtained from ATRP, with a cationic monomer. By halide is here meant chloride, bromide or iodide. The reaction may be conducted either neat, i.e. in bulk, or in a reaction medium. Suitable solvents include acetonitrile, dimethyl formamide, methylene chloride, and others which are inert in the process. The reaction may be conducted at any temperature which allows the block copolymerization proceed, typically a temperature of from 40° C. to 200° C. is employed. The block copolymerization time values depending on the molecular weight one wants.

Suitable ethylenically unsaturated monomers which can be used in the ATRP block (PA) of the copolymer include alkyl esters of acrylic acid or methacrylic acid, such as, methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate; the hydroxyalkyl esters of the same acids, such as, 2-hydroxyethyl acrylate, 2-hydroxyethyl methacrylate, and 2-hydroxypropyl methacrylate; the nitrile and amides of the same acids such as acrylonitrile, methacrylonitrile, acrylamide and methacrylamide; vinyl esters, such as, vinyl acetate, vinyl propionate, vinylidene chloride; vinyl chloride; and vinyl aromatic compounds, such as, styrene, t-butyl styrene, ethyl vinyl benzene, vinyl toluene; dialkyl maleates; dialkyl itaconates; dialkyl methylene-malonates; mixtures thereof and the like. Additionally, the ethylenically unsaturated monomers can be polyfunctional with respect to the polymerization reaction.

Suitable cationically polymerizable monomers are those that can be initiated with an alkyl halide with or without catalyst(s). Examples of these monomers are vinyl aromatic compounds, such as styrene, 4-acetoxystyrene, tert-butyoxy carbonylstyrene, tert-butyl styrene, 4-metoxystyrene; vinyl ethers, such as isobutyl, ethyl, i-octyl, n-nutyl, and n-cetyl vinyl ethers; cyclic imino ethers, such as 2-methyl, 2-ethyl, 2-butyl, 2-oxazolines, 2-methyl,5,6-dihydro-4H-1,3-oxazine.

The following examples will further illustrate the invention:

EXAMPLE 1

A difunctional prepolymer, a,a'-dibromo-polystyrene, was prepared according to the following procedure. Commercial styrene (20 grams), α,α'dibromo p-xylene (2.64 grams), CuBr (1.43 grams), and 2,2'dipyridyl (3.12 grams) were mixed in a reaction flask. The mixture was purged with dry nitrogen gas for about 15 minutes and then heated at 100° C. for 6.5 hrs. The resulting solid was first dissolved in THF and then precipitated in cool methanol/water (50/50 v/v) mixture. The polymer was recovered by filtering through a glass filter and dried under vacuum at 60° C. for 18 hrs with 95% yield. Analysis of polymer by GPC gave weight average molecular weight (Mw) of 2800, and molecular weight distribution (the ratio of weight average molecular weight to number average molecular weight, Mw/Mn) of 1.30.

EXAMPLE 2

In a glove-dry box, the prepolymer prepared in example 1 (1 grams), 2-methyl 2-oxazoline (10 grams), and acetonitrile (40 ml) were charged to a reaction vessel equipped with a magnetic stirring bar. The solution was then heated at 70° C. for 48 hrs. Based on $^1$H NMR analysis, the conversion of 2-methyl 2-oxazoline was 55% and its content in triblock copolymer is 85%. The block copolymer was recovered from precipitation from ether. The weight average molecular weight (Mw) and molecular weight distribution (Mw/Mn) of block copolymer from GPC are 6950 and 1.74, respectively.

The solubility of resulting polymer in several solvents is listed in Table 1. The solubility of prepolymer and homo poly(2-methyl 2-oxazoline) are also given in Table 2 for comparison purpose.

TABLE 1

Solubility of Poly(2-methyl 2-oxazoline)-b-Polystyrene-b- Poly(2-methyl 2-oxazoline) (PMeOZO-b-PS-PMeOZO)

| | Polystyrene | Poly(2-methyl 2-oxazoline)[a] | PMeOZO-b-PS-PMeOZO |
|---|---|---|---|
| water | no | yes | dispersible |
| Methanol | no | yes | yes |
| THF | yes | No | No |
| Acetone | yes | partial | partial |
| Chloroform | yes | yes | yes |
| DMF | yes | yes | yes |

[a]Mn of Poly(2-methyl 2-oxazoline) is ca. 2000.

EXAMPLE 3

A monofunctional prepolymer, bromo-polystyrene with Mw of 2100 and Mw/Mn of 1.35, was prepared according to the procedure illustrated in example 1, except using 1-phenylethyl bromide instead of α,α'-dibromo p-xylene as an initiator. In a glove-dry box, this prepolymer (1 gram) was mixed with 2-methyl 2-oxazoline (4 grams)and anhydrous dimethyl formide (20 ml) in a reaction vessel equipped with a magnetic stirring bar. After the vessel was sealed in glove dry box, the solution was heated at 80° C. for 24 hrs. Based on $^1$H NMR analysis, the conversion of 2-methyl 2-oxazoline was 36%. The block copolymer was recovered by precipitating from cool diethyl ether. The Mw and Mw/Mn of block copolymer from GPC are 5600 and 1.7, respectively.

EXAMPLE 4

The halogen terminals X (X=Cl, Br, I) in block copolymers can be converted into either OH or quaterized salts according to known organic reactions 1 and 2, respectively.

(1)
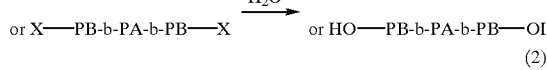

(2)
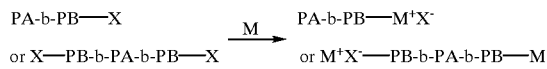

The invention has been described in detail with particular reference to certain preferred embodiments thereof, but it will be understood that variations and modifications can be effected within the spirit and scope of the invention.

What is claimed is:

1. A method for making linear di and triblock copolymers of the formulas I and II $(PA)_x(PB)_yX$ (I)

$X(PB)_y(PA)_x(PB)_yX$ (II)

wherein PA is an ethylenically unsaturated monomer, and PB is a cationically polymerizable monomer [that can be] initiated with an alkyl halide, x is 4 to 500,000 and y is [from] 2 to 500,000 and X is a halogen atoms comprising[; ]. initiating an atom transfer radical polymerization of the PA monomer with an initiator to produce a polymer of the formulas (III) or (IV)

$(PA)_xX$ (III)

$X(PA)_xX$ (IV)

wherein X is a halogen atom, adding polymers of formula (III) or (IV) to monomer (PB) to initiate a living cationic polymerization reaction to produce a polymer shown in formulas (I) or (II).

2. The method of claim 1 wherein PA is selected from the group consisting of alkyl esters of acrylic acid, alkyl esters of methacrylic acid, hydroxyalkyl esters of acrylic acid, hydroxyalkyl esters of methacrylic acid, nitriles of acrylic acid, nitriles of methacrylic acid, amides of acrylic acid, amides of methacrylic acid, vinyl esters and vinyl aromatic compounds.

3. The method of claim 1 wherein PB is selected from the group consisting of vinyl aromatic compounds, vinyl ethers and cyclic imino ethers.

4. The method of claim 1 wherein the atom transfer radical polymerization is conducted at a temperature of from 0° C. to 200° C.

5. The method of claim 1 wherein the cationic polymerization is conducted at a temperature of from 40° C. to 200° C.

* * * * *